United States Patent Office 3,161,607
Patented Dec. 15, 1964

3,161,607
POLYPHOSPHINATE RESINS
Albert Y. Garner, Springfield, Mass., assignor to
Monsanto Company, a corporation of Delaware
No Drawing. Filed Sept. 6, 1960, Ser. No. 53,922
3 Claims. (Cl. 260—2)

This invention relates to novel phosphorous containing resins. More particularly, it relates to the synthesis of novel halophosphonite monomers from which polyphosphinate resins may be prepared. This application is a continuation in part of application Serial No. 742,474, filed June 17, 1958, now abandoned.

The technology of phosphorous polymers has remained relatively undeveloped in the United States, the larger part of the art being developed in the U.S.S.R. However, with the present availability of phosphorous containing intermediates, phosphorous polymers are growing increasingly attractive for use in specialized applications wherein their novel properties can be advantageously utilized.

It is an object of this invention to provide novel phosphorous compounds.

Another object is the provision of novel halophosphonite compounds.

Another object is the provision of novel phosphorous containing monomers and a process for their manufacture.

A further object is the provision of novel phosphorous containing polymers and a process for their manufacture.

These and other objects are attained by reacting a halophosphine with a monohydric alcohol or phenol at a temperature below about 20° C. to form a halophosphonite monomer corresponding to the general formula:

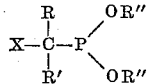

and subsequently heating the halophosphonite monomer at a temperature above the activation temperature of the halogen groups thereof to form a polyphosphinate resin comprised of a plurality of monomeric units corresponding to the general formua:

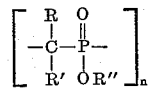

The entire sequence of steps is performed in a substantially oxygen-free atmosphere. In each of the above formulae X is either bromine or chlorine, R and R' may be, independently, either hydrogen or hydrocarbon radicals, R" is a hydrocarbon radical containing from 1–10 carbon atoms and $n$ is an integer of from 10 to 10,000.

The following examples are given in illustration of the invention and are not intended as limitations thereof.

*Example I*

Preparation of chloromethyldichlorophosphine: An ethereal solution of about 0.5 mol of diazomethane is slowly added, over a 5-hour period, with constant stirring, to an ethereal solution of about 0.5 mol of freshly distilled phosphorous trichloride while maintaining a reaction temperature of about −55±5° C. The resulting mixture is allowed to warm to about room temperature, whereupon the mixture is filtered and the ether removed by distillation. The residue is vacuum distilled to yield a colorless fluid boiling at about 76° C. at 135 mm. of mercury pressure and having an index of refraction at 25° C. of about 1.511. The fluid is identified as chloromethyldichlorophosphine.

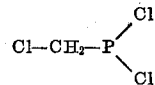

*Example II*

About 1 mol of anhydrous methanol and 0.5 mol of pyridine are placed in a closed reaction vessel under a nitrogen atmosphere. The contents of the reaction vessel are cooled, e.g., in an ice bath to about 0° C. About 0.1 mol of the chloromethyldichlorophosphine prepared in Example I is added slowly and with constant stirring while maintaining the reaction system at about 0 to 10° C. After all of the chloromethyldichlorophosphine has been added the product is recovered by vacuum distillation in a nitrogen atmosphere. The product is dimethylchloromethylphosphonite $$Cl—CH_2—P—(OCH_3)_2$$

and has an index of refraction at 25° of about 1.453. The yield is about 55% based upon the chloromethyldichlorophosphine.

*Example III*

The dimethylchloromethylphosphonite monomer prepared in Example II is heated in a nitrogen atmosphere at a temperature of about 150° C. for about 3 hours. The reaction product contains polymer dissolved in residual monomer. A white, solid polymer is precipitated by pouring the reaction product into an excess of methanol. A low molecular weight liquid polymer is also recovered from the methanol solution by evaporation of the lower boiling solvents. Both the solid and the liquid polymers are identified by infra-red spectroscopy as being poly-(methylmethylenephosphinate).

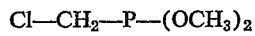

Similar results are obtained substituting alpha-chlorotoluene-dichlorophosphine (B.P. of about 113° C. at 0.5 mm. and $n_D$ at 25° C. of about 1.59, prepared by reacting phenyldiazomethane with phosphorous trichloride in the manner of Example I) and phenol, respectively, for the chloromethyl-dichlorophosphine and methanol employed in Example II and polymerizing the reaction product thereof as in Example III.

The halophosphines employed in preparing the monomers of this invention correspond to the general formula:

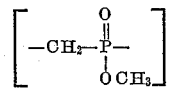

wherein X is either bromine or chlorine and R and R' may be, independently, either hydrogen or hydrocarbon radicals. The compounds may be prepared by the method reported by Yakubovich, Ginsburg and Makarov in Doklady Akad. Nauk., S.S.S.R., vol. 71, page 303 (1950), and by Yakubovich and Ginsburg in Jour. General Chemistry, U.S.S.R., vol. 22, page 1534 (1952). In this method equimolar proportions of a trihalophosphine (PX₃) and a diazoalkane or diazoarylalkane of the species:

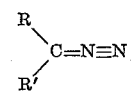

wherein X, R and R' are radicals as above disclosed, are reacted in an ethereal solution at temperatures of from −80° C. to −40° C. in a substantially oxygen-free inert atmosphere. Examples of halophosphines preparable by this method and suitable for use in this invention include chloromethyldichlorophosphine, alphabromoethyl - dibromophosphine, 2 - chloroisopropyl - dichloro - phosphine, alphachlorotoluene - dichlorophosphine, alphachlorodiphenylmethyl-dichlorophosphine, etc.

The mono-hydric alcohols and phenols used in preparing the monomers of this invention correspond to the general formula:

$$R''\text{---}OH$$

wherein R'' is a hydrocarbon radical containing from 1–10 carbon atoms. Among the suitable alcohols may be mentioned methanol, ethanol, isobutanol, tertiary butanol, hexanol, etc. Suitable phenols include phenol, meta-cresol, 3-methyl-2-isopropyl-phenol, etc.

The halophosphonite monomers of this invention are free of ethylenic and acetylenic unsaturation and are prepared by reacting one molar proportion of the halophosphine with two molar proportions of the alcohol or phenol at a temperature below about 20° C., preferably in the range of from −40 to 20° C. Although not necessary, it is preferred to carry out the reaction in the presence of a tertiary base as an acceptor for the hydrogen halide formed. If the tertiary base is omitted, an excess of the alcohol or phenolic component should be used. Examples of suitable tertiary bases include pyridine, N,N-dimethylaniline, etc. The reaction is carried out in an oxygen-free atmosphere obtained, e.g., by purging the reaction vessel with an inert gas such as nitrogen, etc.

The halophosphonite monomers prepared according to the teachings of this invention are high boiling liquids corresponding to the general formula:

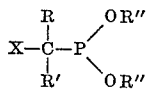

wherein X, R, R' and R'' are radicals as previously described. These monomers are recovered from the final reaction mixture according to conventional low temperature techniques. If a tertiary base is employed, the amine salt thereof, formed during the reaction, is insoluble and may be filtered from the reaction mixture. The excess alcohol or phenol is removed under vacuum using temperatures below the halogen activation temperature of the halophosphonite monomer. Monomer recovery is carried out preferably in an oxygen-free, e.g., nitrogen, atmosphere.

The halophosphonite monomers of this invention may be polymerized by heating at a temperature above the activation temperature of the halogen atoms thereof in an oxygen-free atmosphere. For rapid reaction to high yields, temperatures of from about 75–250° C. are preferred. The polymers are later recovered according to conventional techniques such as precipitation from an excess of a non-solvent, evaporation of the solvents, etc.

The polyphosphinate resins obtained are comprised of a plurality of monomeric units corresponding to the general formula:

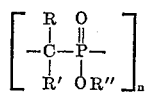

wherein R and R' may be, independently, either hydrogen or hydrocarbon radicals and R'' is a hydrogen radical containing from 1–10 carbon atoms. The degree of polymerization, $n$ of these polymers is from about 10 to 10,000. These polyphosphinate resins are characterized by their outstanding thermal stability, even at temperatures in excess of 400° C. as well as their stability to oxidation and hydrolysis. The lower molecular weight polymers are fluid at room temperature whereas those of the higher molecular weight melt at temperatures above 100° C. Therefore, these resins are useful as heat exchange fluids, especially at high temperatures. Furthermore, they may be used as molding powders, textile sizing, etc. Another important use is as laminating adhesives for wood, glass, metal, etc.

*Example IV*

About 15 grams of the monomer of Example II are heated in a nitrogen atmosphere at 100° C. until viscous. The viscous polymer is poured evenly onto a clean glass plate and a second clean glass plate is placed on top. This sandwich is placed in a press under about 50 p.s.i. pressure and is heated at 200° C. for about one hour to complete the polymerization in situ. The resulting glass laminate is resistant to common solvents and remains intact even after a 10 minute immersion in boiling water.

These polyphosphinates may be used per se or they may be modified by the incorporation of conventional additives such as plasticizers, dyes, pigments, etc. They may also be used in combination with other resins, e.g., alkyds, vinyl, diene polymers, etc.

It is obvious that many variations may be made in the products and processes of this invention without departing from the spirit and scope thereof.

What is claimed is:

1. As compositions of matter, polyphosphinate resins corresponding to the general formula:

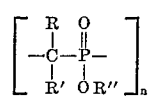

wherein R and R' are radicals independently selected from the group consisting of hydrogen and hydrocarbon radicals free of ethylenic and acetylenic unsaturation, R'' is a hydrocarbon radical free of ethylenic and acetylenic unsaturation and containing from 1–10 carbon atoms and $n$ is an integer of from 10 to 10,000.

2. As compositions of matter, polyphosphinate resins corresponding to the general formula:

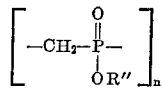

wherein R'' is a hydrocarbon radical free of ethylenic and acetylenic unsaturation and containing from 1–10 carbon atoms and $n$ is an integer of from 10 to 10,000.

3. A process for preparing polyphosphinate resins corresponding to the general formula:

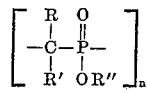

which comprises heating a halophosphonite monomer in a substantially oxygen-free atmosphere at a temperature above the activation temperature of the halogen groups thereof; said halophosphonite monomer corresponding to the general formula:

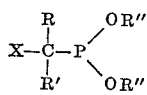

wherein, in the above formulae, X is a halogen selected from the group consisting of bromine and chlorine, R and R' are radicals independently selected from the group consisting of hydrogen and hydrocarbon radicals free of ethylenic and acetylenic unsaturation, R'' is a hydrocarbon radical free of ethylenic and acetylenic unsaturation and containing from 1–10 carbon atoms and $n$ is an integer of from 10 to 10,000.

(References on following page)

References Cited by the Examiner

UNITED STATES PATENTS

| | | | |
|---|---|---|---|
| 2,274,291 | 2/42 | Clayton et al. | 260—461 |
| 2,765,331 | 10/56 | Whetstone et al. | 260—461 |
| 2,860,155 | 11/58 | Walsh | 260—461 |

OTHER REFERENCES

Kabachnik et al.: Chemical Abstracts, vol. 45, page 10191 (1951).

Kosolapoff: Journal American Chemical Society, vol. 66, pages 109–111 (1944).

Kakubovich et al.: Chemical Abstracts, vol. 44, pages 8320–1 (1950).

Kamai et al.: Journal General Chemistry, U.S.S.R., vol. 25, pages 1875–5 (1955), English translation.

MURRAY TILLMAN, *Primary Examiner.*

MILTON STERMAN, LOUISE P. QUAST, *Examiners.*